(12) United States Patent
Nagayama et al.

(10) Patent No.: US 11,541,714 B2
(45) Date of Patent: Jan. 3, 2023

(54) VEHICLE

(71) Applicants: TOYOTA JIDOSHA KABUSHIKI KAISHA, Aichi (JP); SUBARU CORPORATION, Tokyo (JP)

(72) Inventors: Makoto Nagayama, Aichi-ken (JP); Shigenori Hashida, Nisshin (JP); Masaki Yoshida, Toyota (JP); Masataka Tsukumo, Tokyo-to (JP); Hideaki Yoshiba, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/192,893

(22) Filed: Mar. 5, 2021

(65) Prior Publication Data
US 2021/0291613 A1   Sep. 23, 2021

(30) Foreign Application Priority Data

Mar. 19, 2020  (JP) .............................. JP2020-050142

(51) Int. Cl.
   B60G 21/055   (2006.01)
(52) U.S. Cl.
   CPC .... B60G 21/0551 (2013.01); *B60G 2202/135* (2013.01); *B60G 2204/1222* (2013.01); *B60G 2204/41* (2013.01); *B60G 2204/4307* (2013.01)
(58) Field of Classification Search
   CPC .......... B60G 21/055; B60G 2204/4307; B60G 2204/41; B60G 2204/1222; B60G 2202/135; B60G 21/0551
   See application file for complete search history.

(56) References Cited

U.S. PATENT DOCUMENTS

2014/0060709 A1* 3/2014 Tange .................... C22C 38/48
                                                        148/580
2017/0151853 A1* 6/2017 Saiki .................. B60G 21/0551
(Continued)

FOREIGN PATENT DOCUMENTS

DE    102014206087 A1 * 10/2015 ............. B60G 11/18
JP       H2200578 A      8/1990
(Continued)

OTHER PUBLICATIONS

JP 3226546 U machine translation from Espacenet.com Feb (Year: 2022).*

*Primary Examiner* — Paul N Dickson
*Assistant Examiner* — Maxwell L Meshaka
(74) *Attorney, Agent, or Firm* — Hauptman Ham, LLP

(57) ABSTRACT

A vehicle disclosed herein may include: a vehicle body including a front compartment; a drive disposed in the front compartment and configured to drive a wheel; a plurality of brackets attaching the drive to the vehicle body; a stabilizer extending in a right-left direction of the vehicle in the front compartment and connecting a left front suspension and a right front suspension to each other; and a plurality of bushes attaching the stabilizer to the vehicle body, wherein the plurality of bushes may include a first bush located frontward of the drive, the plurality of brackets may include a first bracket located rearward of the first bush, and at least a part of the first bracket may be located above the first bush.

10 Claims, 5 Drawing Sheets

(56) References Cited

U.S. PATENT DOCUMENTS

2018/0257710 A1    9/2018   Komiya et al.
2020/0361409 A1*  11/2020   Chang .................. B60G 21/055
2021/0276643 A1*   9/2021   Ellifson ................ B60G 17/00

FOREIGN PATENT DOCUMENTS

| JP | 2004314672 A |   | 11/2004 |
|----|--------------|---|---------|
| JP | 201787990 A  |   | 5/2017  |
| JP | 2018114786 A |   | 7/2018  |
| JP | 3226546 U    | * | 7/2020  |

* cited by examiner

VEHICLE

CROSS-REFERENCE TO RELATED APPLICATION

This application claims priority to Japanese Patent Application No. 2020-050142, filed on Mar. 19, 2020, contents of which are incorporated herein by reference.

TECHNICAL FIELD

The technology disclosed herein relates to a vehicle.

BACKGROUND

Japanese Patent Application Publication No. 2018-114786 describes a vehicle. The vehicle includes a drive disposed in a front compartment of a vehicle body and configured to drive a wheel, a plurality of brackets attaching the drive to the vehicle body, a stabilizer extending in a right-left direction of the vehicle in the front compartment and connecting a left front suspension and a right front suspension to each other, and a plurality of bushes attaching the stabilizer to the vehicle body.

SUMMARY

In the vehicle as above, as a result of giving consideration to various design factors, the brackets of the drive and the bushes of the stabilizer may be arranged in proximity to each other in a front-rear direction. If the bushes and the brackets are arranged in proximity to each other in the front-rear direction, a space required for such an arrangement becomes larger in the front-rear direction, as a result of which a crushable zone located frontward thereof may become insufficient. In this case, one method of providing a sufficient crushable zone may be enlarging the front compartment of the vehicle in the front-rear direction. However, enlargement of the front compartment may cause another problem such as limitation on freedom of design (esthetic appearance) of the vehicle. The present disclosure provides a technology which can ensure a sufficient crushable zone without enlarging a from compartment of a vehicle.

A vehicle disclosed herein may comprise: a vehicle body comprising a front compartment; a drive disposed in the front compartment and configured to drive a wheel; a plurality of brackets attaching the drive to the vehicle body; a stabilizer extending in a right-left direction of the vehicle in the front compartment and connecting a left front suspension and a right front suspension to each other; and a plurality of bushes attaching the stabilizer to the vehicle body, wherein the plurality of bushes may comprise a first bush located frontward of the drive, the plurality of brackets may comprise a first bracket located rearward of the first bush, and at least a part of the first bracket may be located above the first bush.

In the aforementioned vehicle, the plurality of bushes comprises the first bush located frontward of the drive, the plurality of brackets comprises the first bracket located rearward of the first bush, and the at least a part of the first bracket is located above the first bush. According to such a configuration, a space in which the first bracket is disposed and a space in which the first bush is disposed at least partially overlap each other in the front-rear direction. The stabilizer can be disposed closer to the drive by this overlapping area. This can ensure that a crushable zone to be provided in a required size without enlarging the front compartment of the vehicle body.

DETAILED DESCRIPTION

Figure 1:
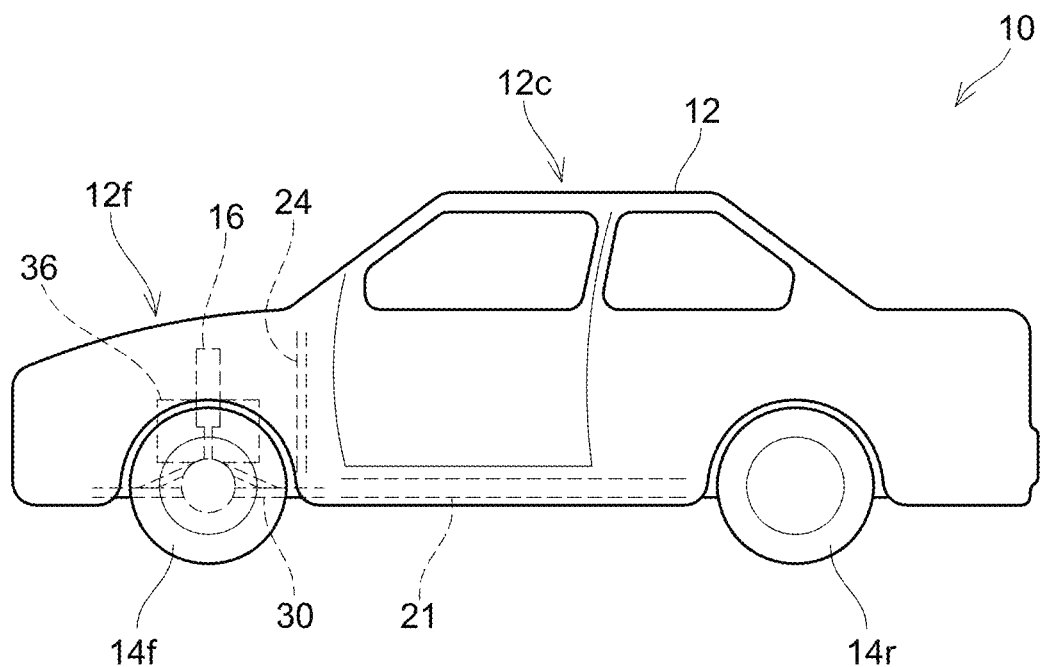
FIG. 1 schematically shows a vehicle 10 of an embodiment.
Figure 1:
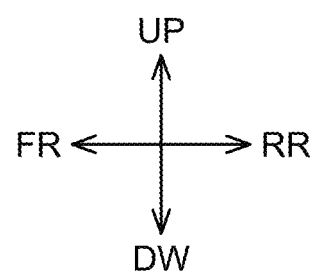

In an embodiment of the present technology, the first bracket may comprise a recess or a hole opening at a front surface of the first bracket. In this case, at least a part of the first bush may be located within the recess or the hole. It should be noted that a shape of the recess or the hole is not particularly limited, and the recess or the hole may have a shape including a bottom, or may be a though hole reaching a rear surface of the first bracket.

In an embodiment of the present technology, the first bracket may comprise a support supporting the drive. In this case, the support may be located above the recess or the hole. According to such a configuration, the first bracket and the first bush can be positioned in proximity to each other without necessity of reducing a size of the support.

In an embodiment of the present technology, the support of the first bracket may support the drive via a vibration isolator. Since the support of the first bracket is located above the first bush, the support does not interfere with the first bush, and a size thereof can be relatively increased. Due to this, although not particularly limited, the vibration isolator can be suitably provided in the support of the first bracket as needed.

In an embodiment of the present technology, the first bush may comprise a plurality of fixed portions fixed to the vehicle body with fasteners, and at least one of the plurality of fixed portions may be located within the recess or the hole of the first bracket.

In an embodiment of the present technology, the vehicle body may further comprise a suspension member supporting the left and right front suspensions. In this case, the first bush and the first bracket may be attached to the suspension member.

In an embodiment of the present technology, the suspension member may comprise: a pair of side rails extending in a front-rear direction of the vehicle; and a front crossmember extending between the pair of side rails and located frontward of the drive. In this case, the first bush and the first bracket may be located on the front crossmember.

In addition to the above, a part of the first bracket may be located on one of the side rails. According to such a configuration, the first bracket and the first bush are arranged on the suspension member in a vicinity of an end thereof in the right-left direction. Due to this, an interval between the plurality of bushes that attaches the stabilizer to the vehicle body (i.e., inter-fulcrum distance) becomes relatively larger. Due to this, stiffness of the stabilizer against bending and twisting can be enhanced.

In an embodiment of the present technology, the plurality of bushes may further comprise a second bush located frontward of the drive and located symmetrically to the first bush in the vehicle body. In addition, the plurality of brackets may further comprise a second bracket located rearward of the second bush. In this case, at least a part of the second bracket may be located above the second bush.

In an embodiment of the present technology, the drive may comprise at least one of a motor or an engine.

Here, a direction FR in drawings shows a frontward direction in a front-rear direction of the vehicle 10, and a direction RR shows a rearward direction in the front-rear direction of the vehicle 10. A direction LH shows a leftward direction in a right-left direction (or a width direction) of the vehicle 10, and a direction RH shows a rightward direction in the right-left direction of the vehicle 10. A direction UP shows an upward direction in an up-down direction of the vehicle 10, and a direction DW shows a downward direction in the up-down direction of the vehicle 10. In the present disclosure, the front-rear direction of the vehicle 10, the right-left direction of the vehicle 10, and the up-down direction of the vehicle 10 may simply be referred to as the front-rear direction, the right-left direction, and the up-down direction, respectively. It should be noted that a front compartment 12*f* herein refers to a space defined frontward of a dash panel 24 in a vehicle body 12.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Figure 2:
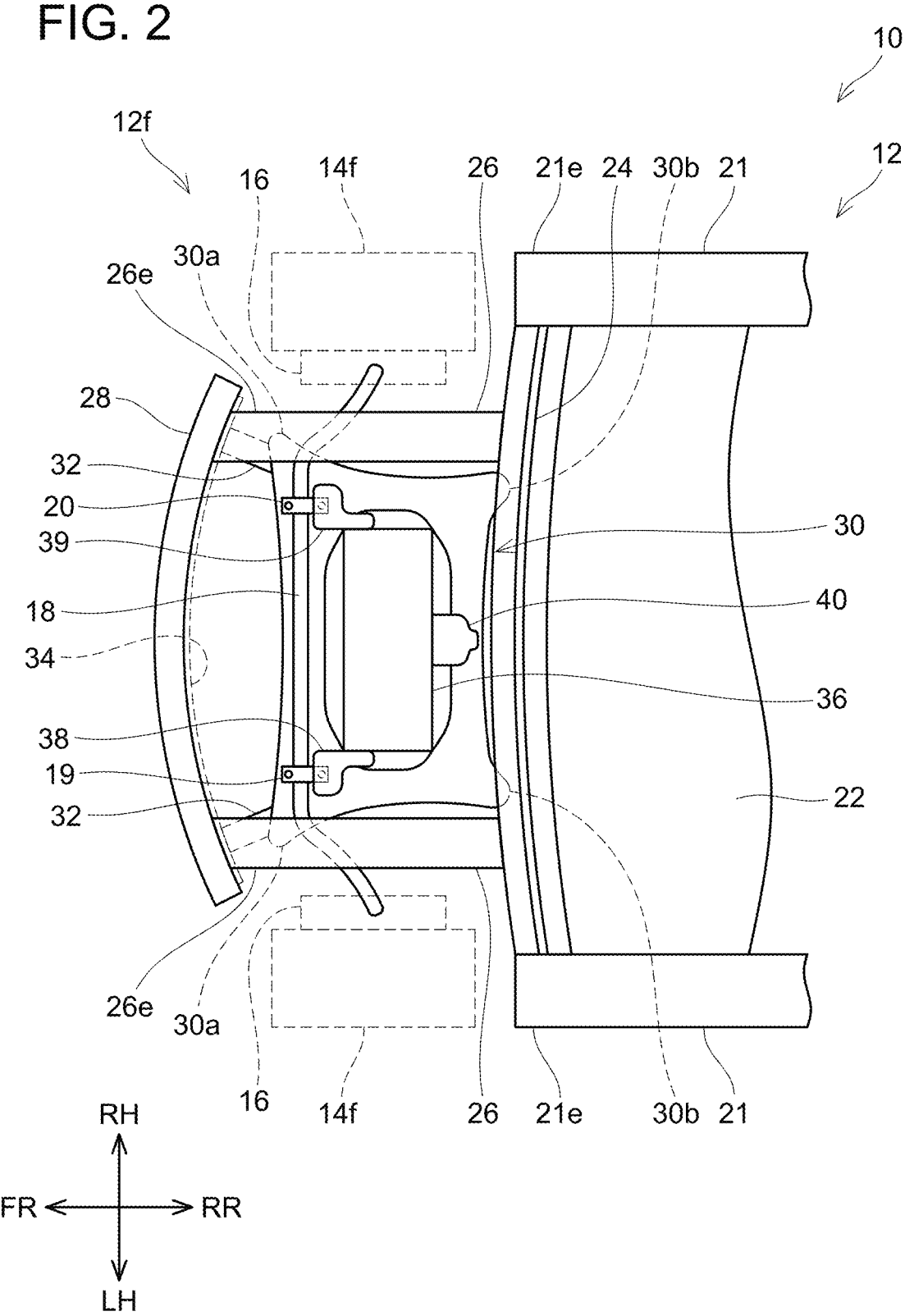
FIG. 2 is a plan view schematically showing a from end structure of the vehicle 10.

A vehicle 10 of an embodiment will be described with reference to the drawings. As illustrated in FIGS. 1 and 2, the vehicle 10 includes a vehicle body 12, a plurality of wheels 14*f*, 14*r*, a motor unit 36, and a plurality of brackets 38, 39, 40. A front compartment 12*f* and a cabin 12*c* are defined in the vehicle body 12. Although not particularly limited, the vehicle body 12 is constituted of metal such as steel or aluminum alloy. The plurality of wheels 14*f*, 14*r* includes a pair of front wheels 14*f* and a pair of rear wheels 14*r*. The front wheels 14*f* are respectively positioned on right and left sides of the vehicle body 12, and the rear wheels 14*r* are respectively positioned on the right and left sides of the vehicle body 12. The number of the wheels 14*f*, 14*r* is not limited to four.

The motor unit 36 is disposed in the front compartment 12*f*. The motor unit 36 is attached to the vehicle body 12 via the plurality of brackets 38, 39, 40. The motor unit 36 includes a motor configured to drive the pair of front wheels 14*f*. The motor herein refers to an electric traction motor driven by electricity. The motor unit 36 is an example of a drive of the technology disclosed herein. It should be noted that the drive is not limited to this, but may include at least one of a motor or an engine. This motor unit 36 may be configured to drive not only the pair of front wheels 14*f* but also the pair of rear wheels 14*r*. Alternatively, the vehicle 10 may include another motor unit 36 configured to drive the rear wheels 14*r*. Although not shown, electric power is supplied to the motor unit 36 from a high-voltage battery via an electric power converter.

As shown in FIG. 2, the vehicle 10 includes a stabilizer 18 and a plurality of bushes 19, 20. The stabilizer 18 extends in the right-left direction of the vehicle 10 in the front compartment 12*f*. The stabilizer 18 connects respective front suspensions 16 of the front wheels 14*f* on the right and left sides to each other. The stabilizer 18 is attached to the vehicle body 12 via the plurality of bushes 19, 20. The stabilizer 18 is positioned frontward of the motor unit 36. As such, the plurality of bushes 19, 20 is also positioned frontward of the motor unit 36.

The vehicle body 12 includes a pair of side sills 21, a floor panel 22, and a dash panel 24. The pair of side sills 21 respectively extends in the front-rear direction at both ends of a lower portion of the vehicle body 12. Each of the plurality of wheels 14*f*, 14*r* is disposed along corresponding one of the pair of side sills 21. Each of the pair of side sills 21 is interposed between corresponding one of the front wheels 14*f* and corresponding one of the rear wheels 14*r*. The floor panel 22 is positioned at the lower portion of the vehicle body 12, and extends from one of the side sills 21 to the other of the side sills 21. The dash panel 24 extending in the up-down direction is attached to front ends 21*e* of the pair of side sills 21.

In the vehicle body 12, the front compartment 12*f* and the cabin 12*c* are defined by the dash panel 24. The front compartment 12*f* is defined frontward of the dash panel 24, and the cabin 12*c* is defined rearward of the dash panel 24.

The vehicle body 12 includes a pair of front side members 26, a first bumper reinforcement 28, a suspension member 30, a pair of crash boxes 32, and a second bumper reinforcement 34 in the front compartment 12*f*. The pair of front side members 26 is attached to the dash panel 24. The pair of front side members 26 extends frontward from the dash panel 24. The first bumper reinforcement 28 is attached to front ends 26*e* of the pair of front side members 26.

The suspension member 30 is attached to the vehicle body 12 in the front compartment. 12*f*. The suspension member 30 supports, together with the vehicle body 12, the front suspensions 16 of the right and left front wheels 14*f*. The suspension member 30 is positioned below the pair of front side members 26. The suspension member 30 supports the aforementioned motor unit 36 via the plurality of brackets 38, 39, 40. The plurality of brackets 38, 39, 40 includes a first bracket 38, a second bracket 39, and a third bracket 40. The motor unit 36 is thereby stably supported by the three brackets 38, 39, 40. It should be noted that the number of brackets 38, 39, 40 is not limited to three. Although this is merely an example, the motor unit 36 may be attached to the vehicle body 12 via four brackets attached to the suspension member 30.

Figure 3:
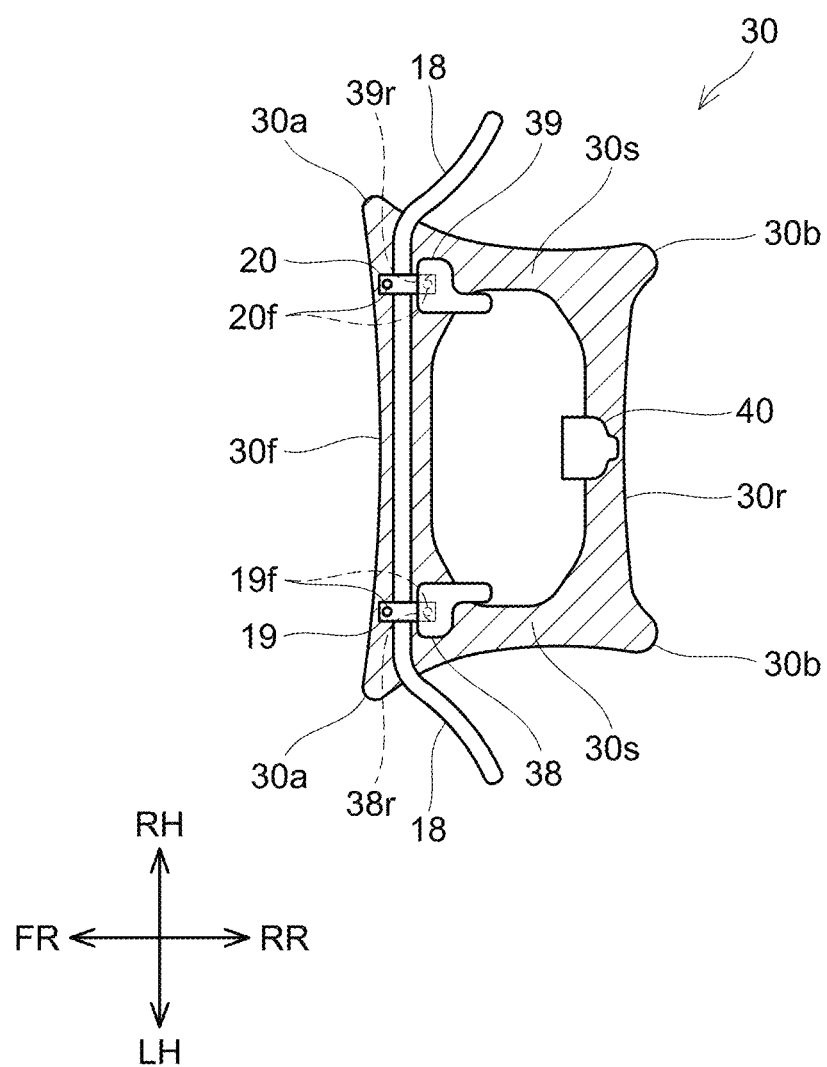
FIG. 3 schematically shows a suspension member 30 and parts connected thereto. For clearer structural illustration, a motor unit 36 is not shown. The suspension member 30 is hatched with diagonal lines.

As shown in FIG. 3, the suspension member 30 includes a pair of side rails 30s, a front crossmember 30f and a rear crossmember 30r. The pair of side rails 30s extends along the front-rear direction of the vehicle 10. The front crossmember 30f and the rear crossmember 30r extend between the pair of side rails 30s in the right-left direction. The front crossmember 30f is positioned frontward of the motor unit 36, and the rear crossmember 30r is positioned rearward of the motor unit 36.

Although not particularly limited, each of the pair of side rails 30s of the suspension member 30 includes a rear end 30b attached to the dash panel 24 and a front end 30a attached to corresponding one of the front side members 26. Due to this, the suspension member 30 is attached to the vehicle body 12. The second bumper reinforcement 34 is attached to the front ends 30a of the pair of side rails 30s via the crush boxes 32.

The plurality of brackets 38, 39, 40 is attached to the suspension member 30. The first bracket 38 and the second bracket 39 are located on the front crossmember 30f of the suspension member 30. Specifically, the first bracket 38 is located on a left end of the front crossmember 30f and the second bracket 39 is located on a right end of the front crossmember 30f. The third bracket 40 is located on the rear crossmember 30r.

The plurality of bushes 19, 20 is attached to the suspension member 30. The plurality of bushes 19, 20 includes a first bush 19 and a second bush 20. The first bush 19 and the second bush 20 are located on the front crossmember 30f of the suspension member 30. The second bush 20 is located symmetrically to the first bush 19 with respect to the vehicle body 12 in the right-left direction. Specifically, the first bush 19 is located on the left end of the front crossmember 30f and the second bush 20 is located on the right end of the front crossmember 30f. The first bracket 38 is located rearward of the first bush 19, and the second bracket 39 is located rearward of the second bush 20. The first bush 19 and the first bracket 38 will be described in details with reference to FIGS. 3 to 5 below.

Figure 4:
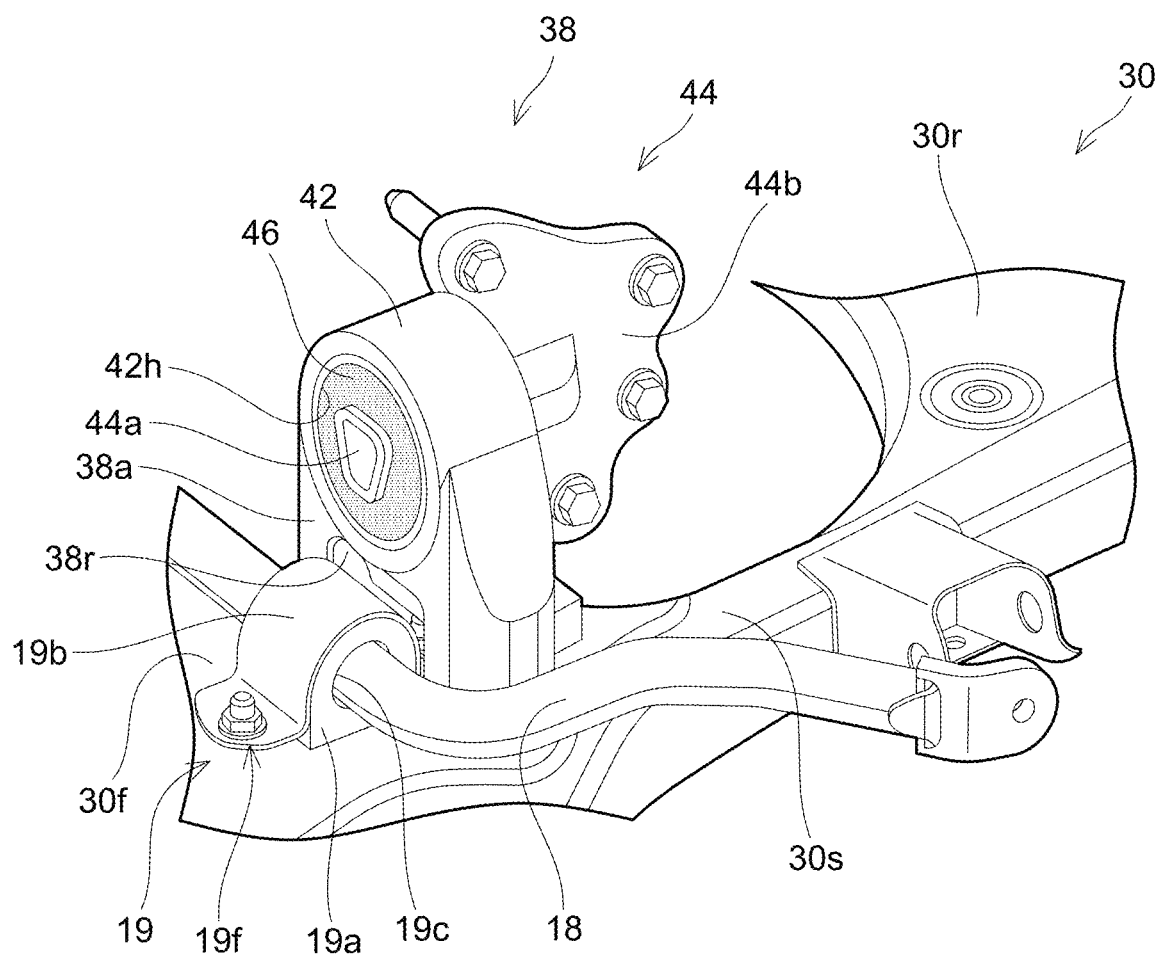
FIG. 4 shows a perspective view of a first bracket 38 and a first bush 19.
Figure 5:
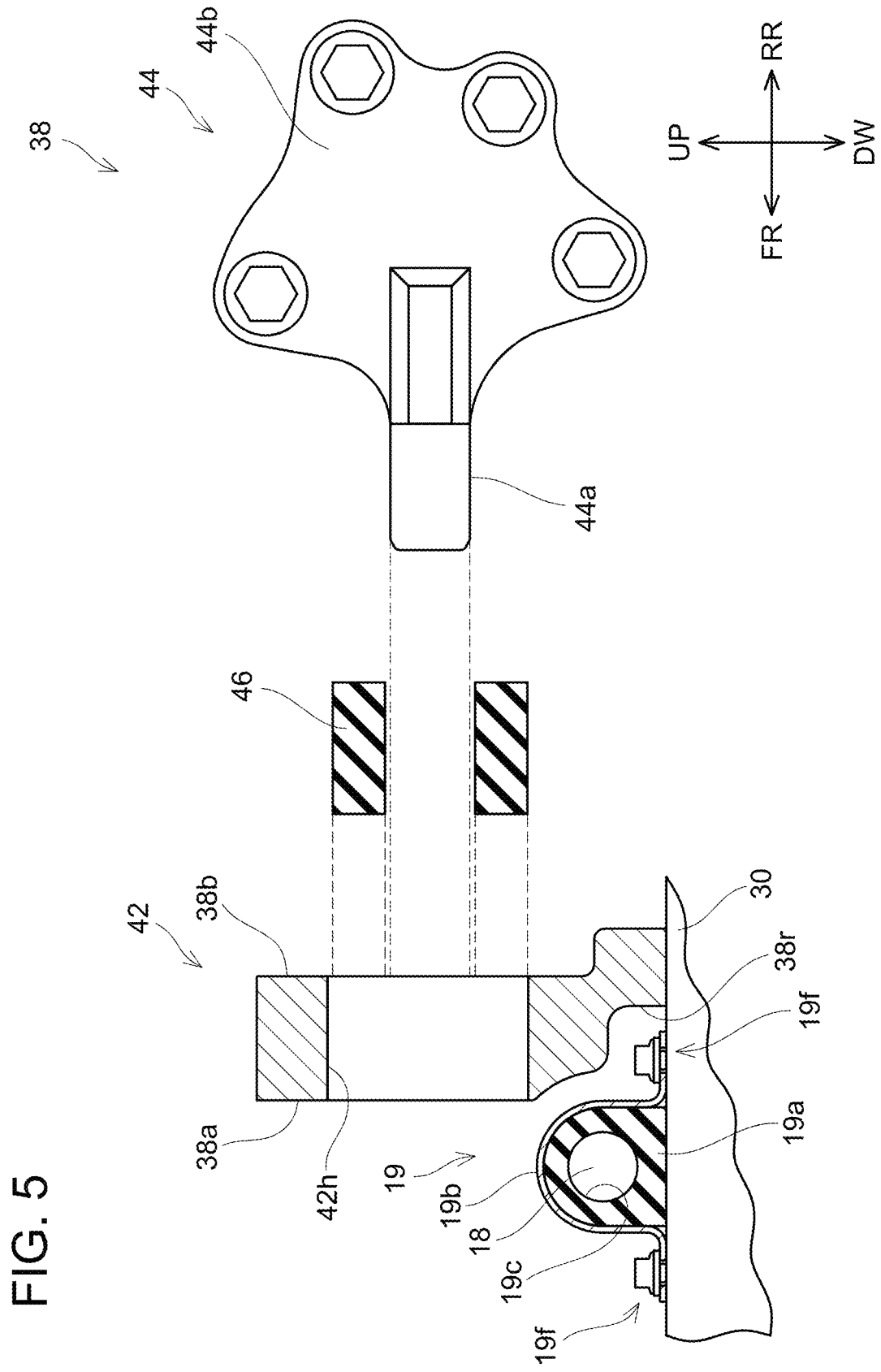
FIG. 5 shows a cross-sectional view of the first bracket 38 and the first hush 19. The first bracket 38 is illustrated as being exploded.

As shown in FIGS. 4 and 5, the first bush 19 includes a bush body 19a and a bush holder 19b. The bush body 19a is substantially tubular, and constituted of a member having viscoelasticity, such as a rubber member. The bush holder 19h covers the bush body 19a. The bush holder 19h extends over and beyond the bush body 19a in the front-rear direction. The bush holder 19b is constituted of metal. The stabilizer 18 passes though a hole 19e in the bush body 19a and is held by the bush body 19a. The bush holder 19b is configured to fix the bush body 19a to the suspension member 30. The bush holder 19b is provided with a plurality of fixed portions 19f. The bush holder 19b is fixed to the suspension member 30 via fasteners such as bolts at the plurality of fixed portions 19f. The second bush 20 can be configured similar to the first bush 19. Due to this, the stabilizer 18 is attached onto the suspension member 30 via the first bush 19 and the second bush 20.

The first bracket 38 includes a base 42 fixed to the suspension member 30, a support 44 fixed to the motor unit 36, and a vibration isolator 46 interposed between the base 42 and die support 44. The base 42 includes a front surface 38a and a rear surface 38b located on an opposite side thereof. An insertion hole 42h for receiving the support 44 is defined in the base 42. The insertion hole 42h extends from the front surface 38a to the rear surface 38b of the base 42. The support 44 includes a plate 44b fixed to the motor unit 36 and a shaft 44a extending from the plate 44b toward the base 42. The plate 44b is attached to the motor unit 36 via fasteners such as bolts. The shaft 44a of the support 44 is inserted, together with the vibration isolator 46, into the insertion hole 42h of the base 42. Due to this, the motor unit 36 is supported onto the suspension member 30 via the first bracket 38. The vibration isolator 46 is constituted of a member having viscoelasticity, such as a rubber member.

The first bracket 38 is located in proximity to and rearward of the first bush 19. In particular, the first bracket 38 includes a recess 38r opening at its font surface 38a, and a part of the first bush. 19 (for example, the fixed portion 190 is located within the recess 38r of the first bracket 38. Due to this, as a part of the first bracket 38 (for example, a top portion of the base 42) covers a larger area of a top of the first bush 19, the first hush 19 and the first bracket 38 are located closer to each other. Here, the first bracket 38 may include, not limited to the recess 38r, a hole opening at the front surface 38a of the base 42. A Shape of the recess 38r or the hole is not limited. The recess 38r or the hole may have a shape including a bottom, or may be a through hole reaching the rear surface 38b of the first bracket 38. Further, a size of the recess 38r or the hole is also not particularly limited. The recess 38r of the first bracket. 38 needs only have a dimension that can accept at least the part of the first hush 19.

As shown in FIG. 3, the second bracket 39 is located rearward of the second bush 20. The second bracket 39 has a configuration similar to the first bracket 38. In other words, the second bracket 39 includes a recess 39r opening at its front surface, and a part of the second bush 20 is located within the recess 39r thereof. Due to this, as a larger area of a part of the second bush 20 (for example, a fixed portion 20f) is located within the recess 39r of the second bracket 39, the second hush 20 and the second bracket 39 are located closer to each other.

The third bracket 40 also includes a base fixed to the suspension member 30, a support fixed to the motor unit 36, and a vibration isolator interposed between the base and the support. A configuration of the third bracket 40 is not particularly limited. The third bracket 40 may or may not include a recess or a hole similar to those of the first bracket 38 and the second bracket 39. The third bracket 40 needs only be configured to stably support the motor unit 36 together with the first bracket 38 and the second bracket 39.

In the vehicle 10 of the present embodiment, the first bush 19 and the second bush 20 for the stabilizer 18 are located frontward of the motor unit 36. Further, the first bracket 38 and the second bracket 39 for the motor unit 36 are respectively located rearward of the first bush 19 and the second bush 20. When the bushes 19, 2.0 and the brackets 38, 39 are arranged in proximity to each other in the front-rear direction as above, a space required for such an arrangement becomes larger in the front-rear direction, as a result of which a crushable zone located frontward thereof may become insufficient. In this case, one method of providing a sufficient crushable zone may be enlarging the front compartment 12f of the vehicle body 12 in the front-rear direction. However, enlargement of the front compartment 12f may cause another problem such as limitation on freedom of design (esthetic appearance) of the vehicle 10.

To address the above problem, in the vehicle 10 of the present embodiment, the first bracket 38 includes the recess 38*r* and a part of the first hush 19 is disposed within the recess 38*r*. Due to this, as the part of the first bracket 38 covers a larger area of the top of the first bush 19, the first bush 19 and the first bracket 38 are located closer to each other. According to such a configuration, a space in which the first bracket 38 is disposed and a space in which the first hush 19 is disposed partially overlap each other in the front-rear direction. The stabilizer 18 can be disposed closer to the motor unit 36 by this overlapping area. This can ensure that a crushable zone to be provided in a required size without enlarging the front compartment 12*f* of the vehicle body 12.

The same applies to the second bracket 39. In other words, the second bracket 39 includes the recess 39*r* and a part of the second bush 20 is disposed within the recess 39*r*. Due to this, as the part of the second bracket 39 covers a larger area of the top of the second bush 20, the second bush 20 and the second bracket 39 are located closer to each other. Accordingly, a space in which the second bracket 39 is disposed and a space in which the second bush 20 is disposed at least partially overlap each other in the front-rear direction. The stabilizer 18 thereby can be disposed closer to the motor unit 36 by this overlapping area.

In the vehicle 10 of the present embodiment, the first bracket 38 includes the support 44 supporting the motor unit 36. The support 44 may be located above the recess 38*r* or the hole. According to such a configuration, the first bracket 38 and the first bush 19 can be positioned in proximity to each other without necessity of reducing a size of the support 44.

In the vehicle 10 of the present embodiment, the support 44 of the first bracket 38 supports the motor unit 36 via the vibration isolator 46. Since the support 44 of the first bracket 38 is located above the first bush 19, the support 44 does not interfere with the first bush 19, and a size thereof can be relatively increased. Due to this, although not particularly limited, the vibration isolator 46 can be suitably provided in the support 44 of the first bracket 38 as needed.

In the vehicle 10 of the present embodiment, the first bracket 38 is located on the left end of the front crossmember 30*f* of the suspension member 30. This position is not limiting, and a part of the first bracket 38 may be located on one of the side rails 30*s*. According to such a configuration, the first bracket 38 and the first bush 19 are arranged on the suspension member 30 in a vicinity of an end thereof in the right-left direction. Due to this, an interval between the plurality of bushes 19 that attaches the stabilizer 18 to the vehicle body 12 (i.e., inter-fulcrum distance of the stabilizer 18) becomes relatively larger. Due to this, stiffness of the stabilizer 18 against bending and twisting can be enhanced.

What is claimed is:

1. A vehicle comprising:
a vehicle body comprising a front compartment;
a drive disposed in the front compartment and configured to drive a wheel;
a plurality of brackets attaching the drive to the vehicle body;
a stabilizer extending in a right-left direction of the vehicle in the front compartment and connecting a left front suspension and a right front suspension to each other; and
a plurality of bushes attaching the stabilizer to the vehicle body,
wherein
the plurality of bushes comprises a first bush located frontward of the drive,
the plurality of brackets comprises a first bracket located rearward of the first bush,
at least a part of the first bracket is located above the first bush,
the first bracket comprises a recess or a hole opening at a front surface of the first bracket,
at least a part of the first bush is located within the recess or the hole,
the first bush comprises a plurality of fixed portions fixed to the vehicle body with fasteners, and
at least one of the plurality of fixed portions is located within the recess or the hole of the first bracket.

2. The vehicle according to claim 1, wherein the first bracket comprises a support located above the recess or the hole and supporting the drive.

3. The vehicle according to claim 2, wherein the support of the first bracket supports the drive via a vibration isolator.

4. The vehicle according to claim 1, wherein the vehicle body further comprises a suspension member supporting the left and right front suspensions, and
the first bush and the first bracket are attached to the suspension member.

5. The vehicle according to claim 4, wherein
the suspension member comprises:
a pair of side rails extending in a front-rear direction of the vehicle; and
a front crossmember extending between the pair of side rails and located frontward of the drive,
the first bush and the first bracket are located on the front crossmember, and
a part of the first bracket is located on one of the side rails.

6. The vehicle according to claim 1, wherein
the plurality of bushes further comprises a second bush located frontward of the drive and located symmetrically to the first bush in the vehicle body,
the plurality of brackets further comprises a second bracket located rearward of the second bush, and
at least a part of the second bracket is located above the second bush.

7. A vehicle comprising:
a vehicle body comprising a front compartment;
a drive disposed in the front compartment and configured to drive a wheel;
a plurality of brackets attaching the drive to the vehicle body;
a stabilizer extending in a right-left direction of the vehicle in the front compartment and connecting a left front suspension and a right front suspension to each other; and
a plurality of bushes attaching the stabilizer to the vehicle body,
wherein
the plurality of bushes comprises a first bush located frontward of the drive,
the plurality of brackets comprises a first bracket located rearward of the first bush,
at least a part of the first bracket is located above the first bush,
the vehicle body further comprises a suspension member supporting the left and right front suspensions,
the first bush and the first bracket are attached to the suspension member,
the suspension member comprises:

a pair of side rails extending in a front-rear direction of the vehicle; and a front crossmember extending between the pair of side rails and located frontward of the drive, the first bush and the first bracket are located on the front crossmember, and a part of the first bracket is located on one of the side rails.

8. The vehicle according to claim 7, wherein the first bracket comprises a recess or a hole opening at a front surface of the first bracket, and at least a part of the first bush is located within the recess or the hole.

9. The vehicle according to claim 8, wherein the first bracket comprises a support located above the recess or the hole and supporting the drive.

10. The vehicle according to claim 7, wherein the plurality of bushes further comprises a second bush located frontward of the drive and located symmetrically to the first bush in the vehicle body, the plurality of brackets further comprises a second bracket located rearward of the second bush, and at least a part of the second bracket is located above the second bush.

\* \* \* \* \*